United States Patent
Poulakis

(10) Patent No.: US 9,316,416 B2
(45) Date of Patent: Apr. 19, 2016

(54) PANEL ARRANGEMENT WITH CLAMPING CLIP

(71) Applicant: Gottlieb Binder GmbH & Co. KG, Holzgerlingen (DE)

(72) Inventor: Konstantinos Poulakis, Hildrizhausen (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 0 days.

(21) Appl. No.: 14/275,274

(22) Filed: May 12, 2014

(65) Prior Publication Data

US 2014/0246077 A1 Sep. 4, 2014

Related U.S. Application Data

(62) Division of application No. 13/261,298, filed as application No. PCT/EP2010/006573 on Oct. 27, 2010, now abandoned.

(51) Int. Cl.
| | |
|---|---|
| *F24J 2/52* | (2006.01) |
| *E04C 2/20* | (2006.01) |
| *E04C 2/38* | (2006.01) |
| *E04B 2/00* | (2006.01) |
| *A44B 18/00* | (2006.01) |

(Continued)

(52) U.S. Cl.
CPC ............ *F24J 2/5245* (2013.01); *A44B 18/0073* (2013.01); *E04C 2/20* (2013.01); *E04C 2/38* (2013.01); *E04C 2/44* (2013.01); *E04D 5/145* (2013.01); *F24J 2/5247* (2013.01); *F24J 2/5256* (2013.01); *H02S 20/22* (2014.12); *H02S 20/23* (2014.12); *F24J 2002/4659* (2013.01); *F24J 2002/4663* (2013.01); *F24J 2002/4665* (2013.01); *Y02B 10/12* (2013.01); *Y02E 10/47* (2013.01); *Y10T 24/2758* (2015.01)

(58) Field of Classification Search
CPC .................. F24J 2002/4663; F24J 2002/4665; F24J 2002/4659; F24J 2/5247; F24J 2/5245; A44B 18/0073; E04D 5/145
See application file for complete search history.

(56) References Cited

U.S. PATENT DOCUMENTS

| | | | |
|---|---|---|---|
| 24,968 A | 8/1859 | Blue | |
| D24,968 S | * 12/1895 | Blue | .............................. D8/349 |

(Continued)

FOREIGN PATENT DOCUMENTS

| | | |
|---|---|---|
| DE | 202008009241 U1 | 11/1999 |
| DE | 102004049595 B3 * | 3/2006 |

(Continued)

*Primary Examiner* — Terrell McKinnon
*Assistant Examiner* — Eret McNichols
(74) *Attorney, Agent, or Firm* — Wenderoth, Lind & Ponack, L.L.P.

(57) ABSTRACT

A device for fastening panel-shaped mats, in particular flexible photovoltaic solar panels, to a supporting structure, has at least one clamping clip (10) in the shape of a section of a plastic profiled body. The clip has opposing profiled limbs (12, 14) forming a clamping space (18) for a holding region (8) of the mat received in it. In the clamping space, the profiled limbs (12, 14) rest with a resilient clamping force against the upper face and the lower face of the holding region (8). The profiled limb (14), which in the clamped state rests against the lower face of the holding region (8) facing the supporting structure, forms a fixing surface (26) on its outer face provided with a connecting element (30) for attaching to the supporting structure.

22 Claims, 3 Drawing Sheets

(51) Int. Cl.
  E04D 5/14 (2006.01)
  H02S 20/23 (2014.01)
  H02S 20/22 (2014.01)
  *F24J 2/46* (2006.01)

(56) References Cited

U.S. PATENT DOCUMENTS

| | | | | |
|---|---|---|---|---|
| D251,124 S | * | 2/1979 | Takeuchi | D19/65 |
| 4,226,006 A | * | 10/1980 | Toyama | 24/3.12 |
| 4,331,492 A | | 5/1982 | Dominguez et al. | |
| D308,935 S | * | 7/1990 | Leatherman | D8/395 |
| 5,076,035 A | * | 12/1991 | Wright | 52/464 |
| 5,489,078 A | | 2/1996 | Risley | |
| 5,653,414 A | * | 8/1997 | Chimel | 248/316.7 |
| 5,921,511 A | | 7/1999 | LaPointe | |
| 6,061,978 A | * | 5/2000 | Dinwoodie et al. | 52/173.3 |
| 6,073,899 A | | 6/2000 | Omrani | |
| 6,149,229 A | | 11/2000 | Dillon et al. | |
| 6,467,742 B1 | | 10/2002 | Pitcher | |
| D471,709 S | * | 3/2003 | Coyne | D3/266 |
| 6,557,480 B1 | | 5/2003 | Nuss | |
| 6,570,084 B2 | | 5/2003 | Dinwoodie | 136/251 |
| 6,959,517 B2 | * | 11/2005 | Poddany et al. | 52/173.3 |
| D530,192 S | | 10/2006 | Becerra | |
| 7,155,870 B2 | * | 1/2007 | Almy | 52/544 |
| 7,185,665 B2 | * | 3/2007 | You | 135/16 |
| 7,374,141 B2 | * | 5/2008 | Holden | 248/205.2 |
| 7,926,777 B2 | | 4/2011 | Koesema, Jr. | |
| 7,997,743 B2 | | 8/2011 | Suzuki et al. | |
| 7,997,773 B2 | * | 8/2011 | Kraus et al. | 362/396 |
| 8,191,320 B2 | | 6/2012 | Mittan et al. | |
| 8,418,983 B2 | | 4/2013 | Hartelius et al. | |
| 8,575,887 B1 | * | 11/2013 | Pomare | 320/101 |
| 8,920,586 B2 | * | 12/2014 | Poulakis | 156/71 |
| 2005/0086843 A1 | | 4/2005 | Buchanan et al. | |
| 2005/0178429 A1 | * | 8/2005 | McCaskill et al. | 136/251 |
| 2006/0006689 A1 | * | 1/2006 | Fernandez et al. | 296/97.9 |
| 2006/0174931 A1 | * | 8/2006 | Mapes et al. | 136/251 |
| 2006/0225781 A1 | * | 10/2006 | Locher | 136/245 |
| 2006/0266405 A1 | | 11/2006 | Lennox | |
| 2007/0227573 A1 | | 10/2007 | Hunter | |
| 2009/0044850 A1 | * | 2/2009 | Kimberley | 136/244 |
| 2009/0045310 A1 | | 2/2009 | Koesema, Jr. | |
| 2009/0266400 A1 | * | 10/2009 | DeLiddo et al. | 136/244 |
| 2010/0193012 A1 | * | 8/2010 | Klammer et al. | 136/251 |
| 2010/0236165 A1 | | 9/2010 | Smith et al. | |
| 2010/0237028 A1 | * | 9/2010 | Cusson | 211/41.1 |
| 2011/0073105 A1 | * | 3/2011 | Tandon | 126/663 |
| 2011/0078892 A1 | | 4/2011 | Hartellus et al. | |
| 2011/0220596 A1 | | 9/2011 | Cusson et al. | |
| 2012/0031468 A1 | * | 2/2012 | Boise et al. | 136/248 |
| 2014/0261638 A1 | * | 9/2014 | Haddock et al. | 136/251 |
| 2015/0341071 A1 | * | 11/2015 | Truchalska | |

FOREIGN PATENT DOCUMENTS

| | | | | |
|---|---|---|---|---|
| EP | 1039549 A1 | * | 9/2000 | |
| JP | 3474171 | * | 12/2003 | |
| WO | WO 2004094748 A1 | * | 11/2004 | E04D 13/18 |
| WO | WO2007123927 A2 | | 11/2007 | |
| WO | WO2007123927 A3 | | 11/2008 | |

* cited by examiner

PANEL ARRANGEMENT WITH CLAMPING CLIP

REFERENCE TO RELATED APPLICATION

This application is a division of U.S. patent application Ser. No. 13/201,298, filed May 30, 2012 and entitled Device for Fastening Panel Form Mats, the subject matter of which is hereby incorporated by reference.

FIELD OF THE INVENTION

The invention relates to a device for fastening panel-form mats, in particular flexible photovoltaic solar panels, to a supporting structure.

BACKGROUND OF THE INVENTION

In the course of the advancing development of solar cells, solar energy recovery has expanded into a plurality of applications. Solar panels are attached to roofs or facades not only for stationary energy recovery for supply of buildings or are set up on corresponding usable surfaces. They also are used on a mobile basis in the form of mat-shaped, flexible solar panels which are also referred to as thin film solar panels. Such flexible solar panels are attached, for example, to exterior surfaces, especially roof surfaces, of motor vehicles, sporting goods, or recreational gear, and to sport aircraft such as gliders, to form a self-contained power supply or to support one. In addition to a plurality of other possible applications, as a result of their flexibility, mat-shaped solar panels are also suitable for attachment to certain types of functional clothing, for example, in safety clothing for the supply of integrated telemetry devices or communications devices.

The fastening to pertinent supporting structures becomes difficult in view of the mechanical properties of flexible solar panels. The flexibility of the panels does facilitate the attachment to carrier surfaces which are not flat, as is generally the case in parts of motor vehicle bodies and in other equipment. Document WO 2007/123927 A2, in this respect, discloses a solution in which, on the entire lower face of the mat-shaped structure, an adhesive connection to the adjoining supporting structure is formed. This solution is not entirely satisfactory in that the surface of the supporting structure must be suitable for forming the large-area adhesive connection and because major temperature changes, as can occur with high temperature values, for example, on vehicle bodies, can lead to distortions or warping due to different coefficients of thermal expansion.

SUMMARY OF THE INVENTION

An object of the invention is to provide an improved device enabling a simple, economical, and reliable fastening of panel-shaped mats, such as flexible solar panels.

According to the invention, this object is basically achieved by a device comprising plastic clamping clips which have the shape of sections of a plastic profiled body, with profiled limbs opposite one another forming between them a clamping space receiving and clamping between themselves a holding region of a pertinent mat or of a solar panel with a resilient clamping force. The clamping clips, for attachment to the supporting structure, have a fastening surface on the outside of the profiled limb that in the clamping state adjoins the lower face of the clamped holding region. A connecting element is between fastening surface and supporting structure. The use of clamping clips forms nonpositive anchoring in which relative movements are possible between the panel and the fastening points formed by the clamping regions of the clamping clips so that thermal expansions of the supporting structures can be compensated and stresses and cracks can be avoided. The device is characterized by low installation effort and is extremely economical since large-area connecting elements which extend over the entire lower face of the panel are not necessary.

In especially advantageous exemplary embodiments, a touch-and-close fastener part is attached to the fastening surface of the lower profiled limb as the connecting element. The interlocking elements of the part form an adhesive connection to interlocking elements located on the supporting structure. Such a touch-and-close fastener part can have conventional interlocking elements in the form of mushroom heads, loops, or hooks. For interlocking elements in the form of hooks, the clamping clips can be fastened especially advantageously to textile or fleece-like supporting structures, with the textile structure or the fleece itself forming the interlocking elements on the support structure. The interlocking elements which belong to the clamping clip can be provided on a separate touch-and-close fastener part whose backing is bonded or cemented to the fastening surface of the pertinent profiled limb. Alternatively, especially interlocking elements made like mushroom heads can also be formed on the fastening surface from the material of the profiled limb itself.

Advantageously, clamping clips with elongated profiled limbs can be provided in the form of flat tapes with the limb adjoining the lower face of the holding region of a pertinent mat being longer than the upper limb. While a desired, sufficient clamping force can be achieved by a profiled limb of comparatively shorter length. The other correspondingly longer profiled limb has a fastening surface with the desired surface size.

The arrangement can advantageously be made such that the lower limb has the shape of a flat tape. On the inside, it forms a flat clamping surface for the holding region of a solar panel. On the outside, it has a flat fastening surface which accommodates the connecting element.

With respect to the shape of the upper profiled limb, in its starting region it can advantageously run flat corresponding to the lower limb. In its middle longitudinal region, it can undergo transition into an arch which approaches the lower limb such that in the vicinity of the free end an arched clamping surface is formed. After the arch toward the free end, it begins to transition away from the lower limb. Shaping of this type facilitates slipping of the clamping clips onto the holding regions of the pertinent panel due to the end region of the upper profiled limb, which region is arched to the outside, with the clamping force acting at the same time with high surface pressure on the holding region due to the arched clamping surface which has been formed.

When using the device for a solar panel in which holding regions are formed by edge zones which have a smaller thickness than the solar modules located within the edge zones, the profiled limbs of the clamping clips can be joined to one another via a profiled web whose length is less than the solar panel height formed from the thicknesses of the solar modules and edge zones. The clamping clips thus have the shape of flat clamps which in the clamping state do not form any elevation at all which projects over the upper face of the solar modules.

Especially advantageously, the profiled body of the clamping clips can be formed from a thermoplastic, easily cementable polymer, for example, acrylonitrile-butadiene-styrene (ABS).

Since the clamping clips are exposed during use in a device for fastening of solar panels, at least the part of the clamping clip which is exposed in the clamped state is preferably provided on the outside with a sunproof and weatherproof coating such as polymethyl methacrylate (PMMA).

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
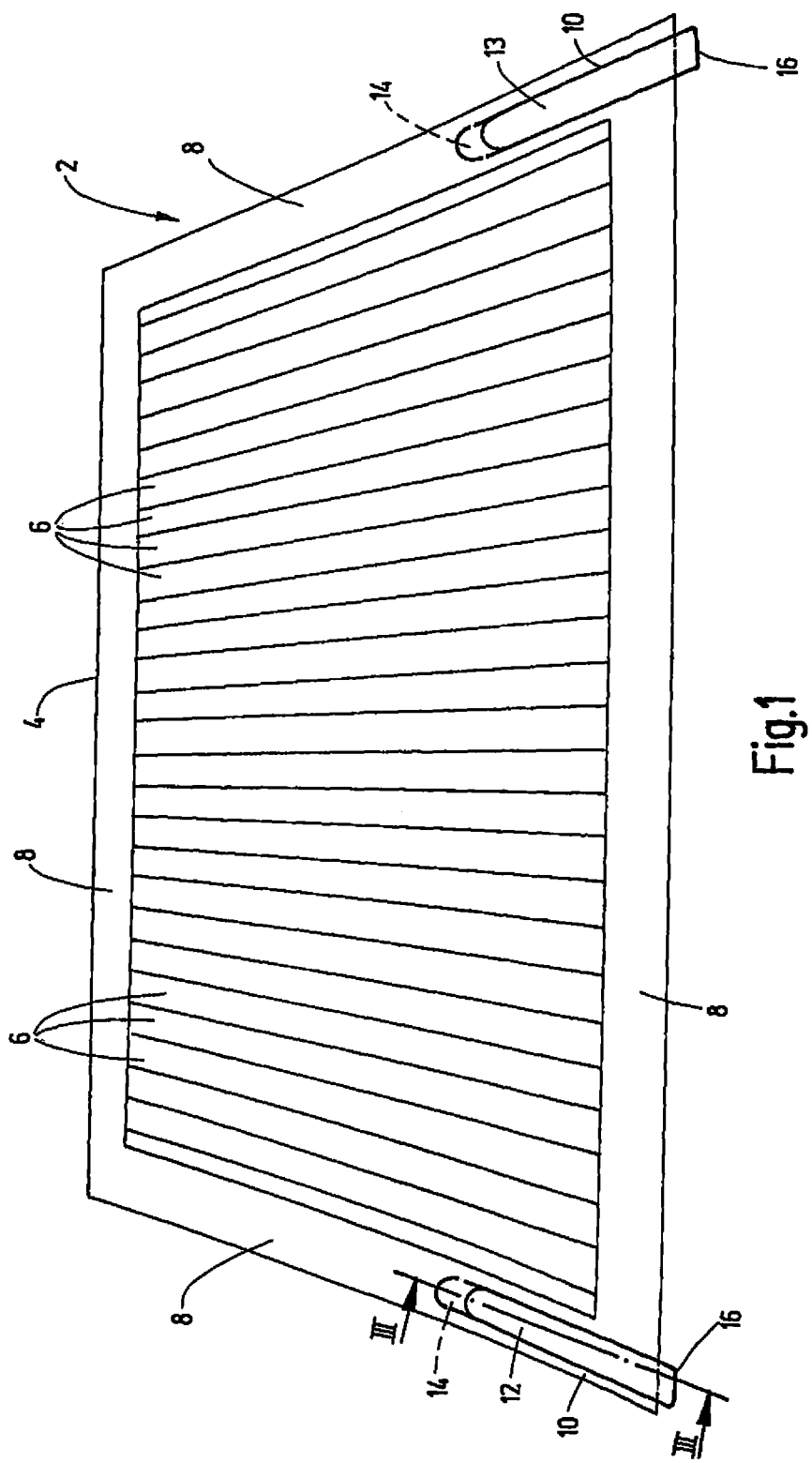
FIG. 1 is a highly simplified perspective view of the upper face of a solar panel, only on two edge zones lying outside the solar modules, a clamping clip according to one exemplary embodiment of the invention being provided.

The invention is explained below using the example of the fastening of a mat-shaped flexible solar panel. The invention is equally well suited to fastening other types of panel-shaped mats. The solar panel 2 in FIG. 1 is on support sheeting 4 fabricated from a preferably burled plastic sheet with a rectangular outline and has an arrangement of a plurality of solar modules 6, of which in FIG. 1 only a few rows are identified in the drawing. In commercial solar modules 6 of this type, the sheeting 4 has dimensions of roughly 55×40 cm and is formed of a weatherproof plastic material such as PMMA or PTFE. The solar modules 6 are arranged on the sheeting 4 such that edge zones 8 remain exposed along the four sides. In the present example, these edge zones 8 are used as holding regions in order to anchor the solar panel 2 on a supporting structure (not shown), in interaction with clamping clips 10 of the device according to the invention. In FIG. 1, only two clamping clips 10 on oppositely facing side edges are illustrated. In the practical application, a suitable plurality of other clamping clips 10 can act on other regions of the edge zones 8, for example, on the other corner regions. In a material of the clamping clips 10 which is translucent to solar radiation, the clips can also be easily located on the solar panel 2 overlapping the region of the solar modules 6.

Figure 2:
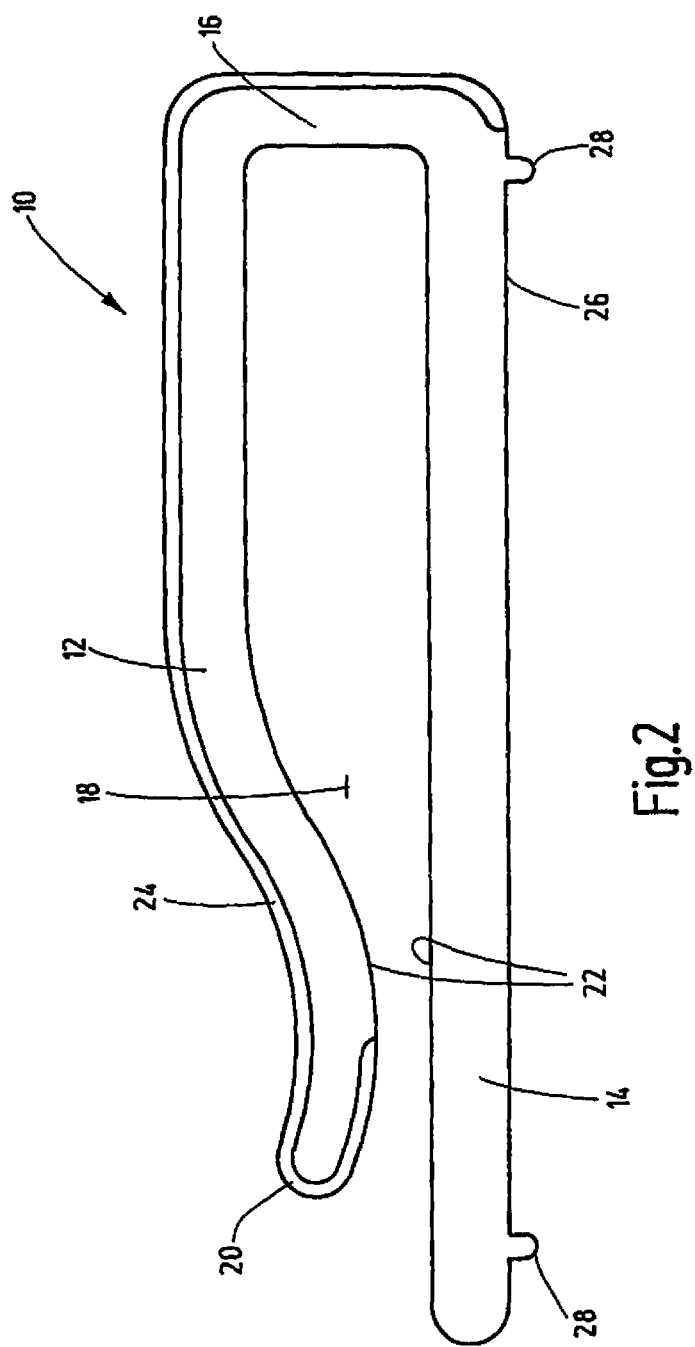
FIG. 2 is a side elevational view of an individual clamping clip, which view is shown slightly enlarged compared to a practical embodiment, according to the exemplary embodiment of the invention.
Figure 3:
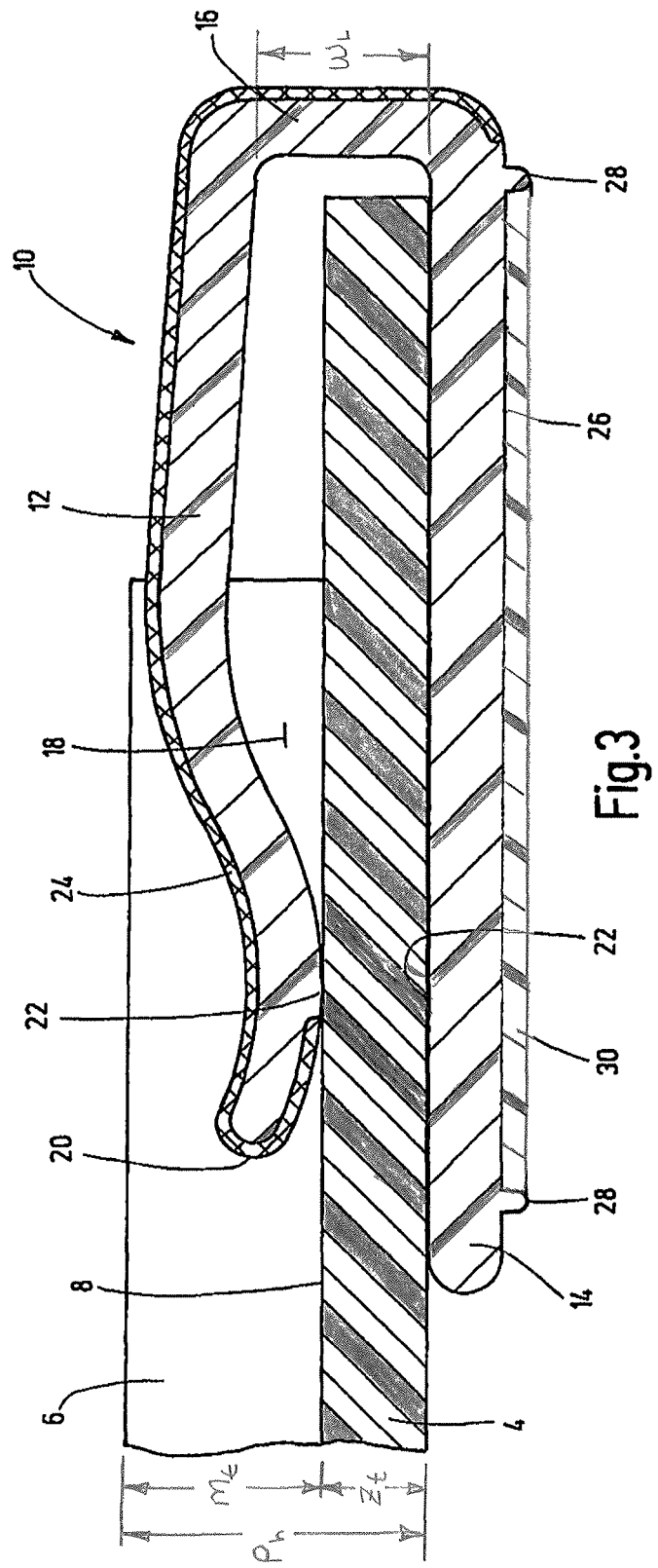
FIG. 3 is a partial side elevational view in section taken along III-III of FIG. 1, which section is shown on the scale similar to FIG. 2.

FIGS. 2 and 3 show details of the clamping clips 10. These are one-piece profiled bodies of a thermoplastic with elasticity properties suitable for producing a clamping force. The thermoplastic can preferably be an easily cementable polymer such as acrylonitrile-butadiene-styrene (ABS). Such profiled body can be efficiently formed by a corresponding strand profile being extruded and by sections which form the individual clamping bodies 10 being cut off the strand. FIGS. 2 and 3 show the profiled shape of the profiled body with two elongated profiled limbs 12 and 14 in the form of flat tapes which are flush with one another, which are opposite one another and of which the profiled limb 14 at the bottom in the figures is longer than the upper profiled limb 12. The profiled limbs 12, 14 are joined to one another via a profiled web 16 whose length is dimensioned such that between the limbs 12, 14, a clamping space 18 is formed in which the edge zone 8 of the solar panel 2 used as a holding region can be accommodated. However, the clamping clip 10 in the clamping state shown in FIG. 3 does not project above the upper face of the solar modules 6 since the web 16 has a length W less than the height $P_h$ of the solar s and formed from thickness $M_t$ of the solar modules 6 and the thickness $Z_t$ of the edge zones 8.

FIG. 3 shows the clamping state in which the edge zone 8 with its lower face adjoins the inner face of the lower profiled limb 14. The upper profiled limb 12 is deflected upward compared to the state shown in FIG. 2 against the force of its elasticity and adjoins the upper face of the edge zone to apply a clamping force between it and the lower profiled limb 14. As FIGS. 2 and 3 show, the upper limb 12 in its starting region extends flat corresponding to the lower limb 14. In a middle longitudinal section, limb 12 undergoes transition into an arch toward the lower limb 14. In the vicinity of its free end 20, limb 12 forms an arched clamping surface 22 connected toward the free end 20 to an opposite arch through which the free end 20 transitions away from the lower profiled limb 14. This variation results in a widening of the entry region to the clamping space 18, simplifying the mounting when the clamping clips 10 are attached.

To protect the parts of the clamping clips 10 which are exposed during use, a sunproof and weatherproof coating 24 is on the clamping clip 10. Proceeding from the outer face of the profiled web 16, coating 24 extends over the upper profiled web 12 and beyond its free end 20 into the vicinity of the clamping surface 22. For example, materials such as polymethyl methacrylate (PMMA) or polytetra-fluoroethylene (PTFE) are suitable for this coating 24. This coating 24 can be efficiently fabricated by a coextrusion method in the production of the profiled strand which forms the clamping clips 10.

The lower profiled limb 14 with its lower face forms the fastening surface 26 for anchoring on the supporting structure (not shown). In FIG. 3, a connecting element 30 is between longitudinal ribs 28 on the connecting surface 26. To form an adhesive connection to the supporting structure, the connecting element 30 can be a layer of adhesive. Advantageously, however, the connecting element 30 can be a touch-and-close fastener part cemented or bonded to the fastening surface 26. It can be a touch-and-close fastener part of a type suitable for the respective application and can be interlocked in a suitable manner with its interlocking elements to the assigned interlocking elements located on the supporting structure. Interlocking elements in the shape of mushroom heads, hooks, or loops are possible, depending on the circumstances on the supporting structure. If the surface of the supporting structure is a textile or fleece-like material, hook-shaped interlocking elements can be preferably provided and can be directly interlocked with the fleece material or the textile structure. Alternatively, interlocking elements shaped like mushroom heads can be molded directly on the lower profiled limb 14 to interact with a plastic touch-and-close fastener part located on the supporting structure.

Preferably, the fastening device according to the invention is not formed as an individual clamp body, but rather extends over the entire length and/or width of a photovoltaic solar panel. Together with the respective solar panel, a complete fastening system is then obtained in which the respective panel, viewed in the direction of FIGS. 2 and 3, can be pushed in with its outer edge perpendicular to the plane of the drawing. In this way, the respective fastening device then made in the shape of a strip with any definable length can remain adhering to the base structure. A replacement of the respective panel at any time is possible, for example, when the photovoltaic components of the solar panel 2 are worn.

The coating layer can be produced by application coating or within the framework of an extrusion method, or the like. Instead of polytetrafluoroethylene, other polyfluoropolymers can also be used.

While one embodiment has been chosen to illustrate the invention, it will be understood by those skilled in the art that various changes and modifications can be made therein without departing from the scope of the invention as defined in the appended claims.

What is claimed is:

1. A panel arrangement, comprising:
   a solar panel having a holding region with upper and lower faces;
   at least one clamping clip having a plastic profiled body with resilient upper and lower profiled limbs, said profiled limbs being opposite one another and forming a clamping space therebetween receiving and holding said holding region by resilient clamping forces applied to said upper and lower faces by said upper and lower profiled limbs, respectively, said lower profiled limb having an outer face facing a supporting structure and forming a fastening surface; and
   a connecting element on said fastening surface attachable to the supporting structure, said connecting element including a touch-and-close fastener part attached to said fastening surface of said lower profiled limb, said fastener part having interlocking elements releasably connectable to interlocking elements located on the supporting structure.

2. A panel arrangement according to claim 1 wherein said solar panel is a photovoltaic solar panel.

3. A panel arrangement according to claim 1 wherein said solar panel is a flexible photovoltaic solar panel.

4. A panel arrangement according to claim 1 wherein said profiled limbs are elongated flat tapes with said lower profiled limb being longer than said upper profiled limb.

5. A panel arrangement according to claim 4 wherein said lower profiled limb has an inner flat clamping surface facing said clamping space and abutting said lower face of said holding region, said fastening surface being flat.

6. A panel arrangement according to claim 5 wherein said upper profiled limb comprises a flat starting region substantially parallel to said lower profiled limb, a middle longitudinal region transitioning into an arch extending toward said lower profiled limb to an arched clamping surface and a free end region transitioning to extend away from said lower profiled limb.

7. A panel arrangement according to claim 1 wherein said holding region of said solar panel comprise edge zones of said solar panel with a smaller thickness than solar modules on said solar panel located within said edge zones; and
   said profiled limbs are joined by a profiled web with a length less than a height of said solar panel formed from thicknesses of said solar modules and said edge zones.

8. A panel arrangement according to claim 1 wherein said profiled body is formed of a thermoplastic, easily cementable polymer.

9. A panel arrangement according to claim 8 wherein said polymer is acrylonitrile-butadiene-styrene.

10. A panel arrangement according to claim 1 wherein an outside surface of exposed portion of said clamping clip has a sunproof and weatherproof coating.

11. A panel arrangement according to claim 10 wherein said coating comprises polymethyl methacrylate.

12. A panel arrangement according to claim 1 wherein said solar panel comprises solar modules arranged on support sheeting with said solar modules being spaced from edge zones of said support sheeting about an entire periphery of said support sheeting to provide a reduced thickness of said solar panel at said peripheral edge.

13. A panel arrangement according to claim 1 wherein said interlocking elements comprise at least one of mushroom heads, hooks or loops.

14. A panel arrangement, comprising:
    a panel having a holding region with upper and lower faces;
    a clamping clip including a plastic profiled body with resilient upper and lower profiled limbs, said profiled limbs being opposite one another and forming a clamping space therebetween receiving and holding said holding region by resilient clamping forces applied by said profiled limbs, said upper profiled limb having a flat starting region substantially parallel to said lower profiled limb, a middle longitudinal region transitioning into an arch extending toward said lower profiled limb to an arched clamping surface and a free end region transitioning to extend away from said lower profiled limb;
    a fastening surface of said lower profiled limb facing away from clamping space; and
    a connecting element on said fastening surface attachable to a supporting structure, said connecting element including a touch-and-close fastener part attached to said fastening surface of said lower profiled limb, said fastener part having interlocking elements releasably connectable to interlocking elements located on the supporting structure.

15. A panel arrangement according to claim 14 wherein said profiled limbs are elongated flat tape.

16. A panel arrangement according to claim 14 wherein said lower profiled limb has an inner flat clamping surface facing said clamping space, said fastening surface being flat.

17. A panel arrangement according to claim 14 wherein said profiled body is formed of a thermoplastic, easily cementable polymer.

18. A panel arrangement according to claim 14 wherein said polymer is acrylonitrile-butadiene-styrene.

19. A panel arrangement according to claim 14 wherein an outside surface of exposed portion of said clamping clip has a sunproof and weatherproof coating.

20. A panel arrangement according to claim 14 wherein said coating comprises polymethyl methacrylate.

21. A panel arrangement according to claim 14 wherein said panel has modules arranged on support sheeting with said modules being spaced from edge zones of said support sheeting about an entire periphery of said support sheeting to provide a reduced thickness of said panel at said peripheral edge.

22. A panel arrangement according to claim 14 wherein said interlocking elements comprise at least one of mushroom heads, hooks or loops.

* * * * *